Patented Feb. 13, 1940

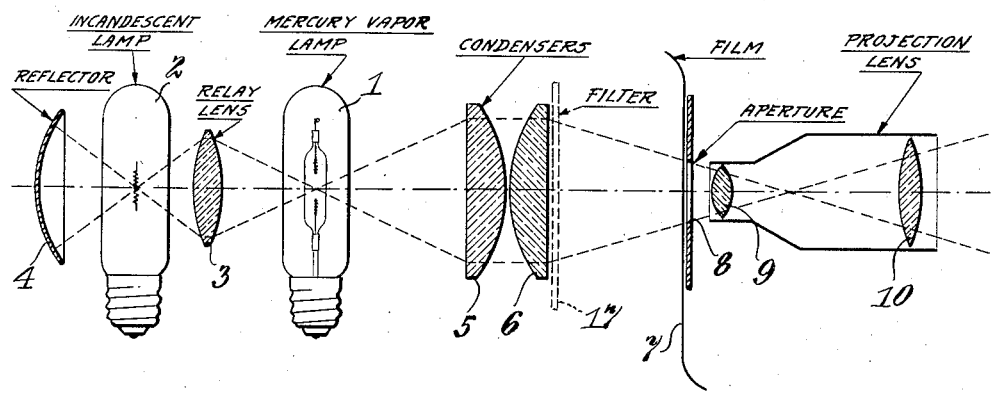
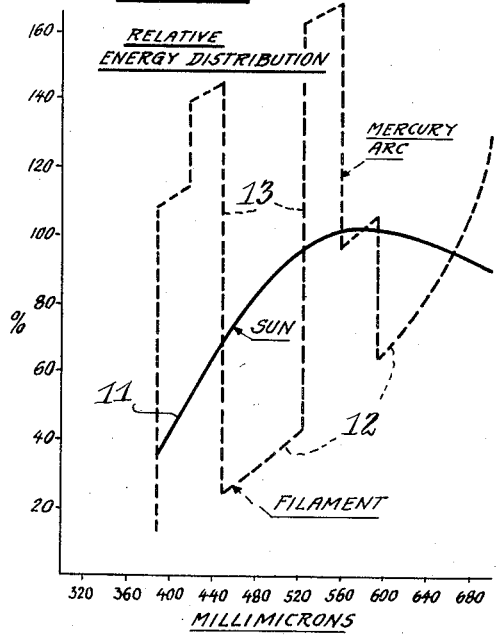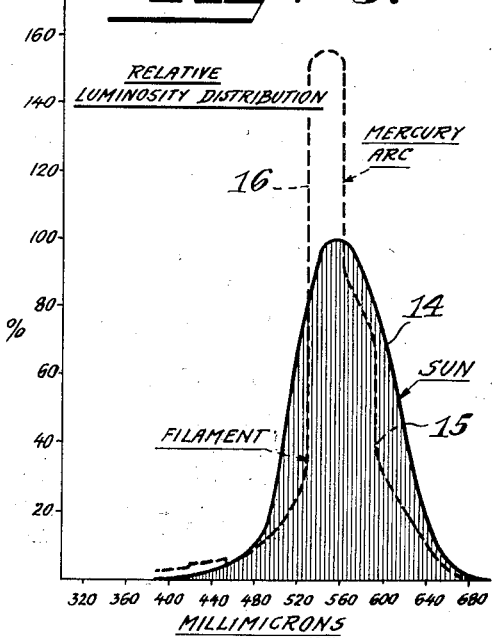

2,190,294

UNITED STATES PATENT OFFICE

2,190,294

LIGHT SOURCE FOR PROJECTION SYSTEMS

Gjon Mili, Upper Montclair, N. J., assignor to Westinghouse Electric & Manufacturing Company, East Pittsburgh, Pa., a corporation of Pennsylvania Application November 6, 1937, Serial No. 173,133

6 Claims. (Cl. 88—24)

This invention relates to a duplex light source and projection system using said source, and, more particularly, to such a system especially adapted for the projection of colored motion pictures.

The principal object of my invention, generally considered, is the combination of two sources of light, one of which is spectrally weak or deficient in certain wave bands and the other of which has spectral characteristics which supplement the light bands that are weak in the first source, whereby the two sources together have a very desirable spectral quality which may approach that of sunlight.

Another object of my invention is a duplex light source and projection system in which the light from a high intensity mercury vapor lamp is augmented and modified by the light from an incandescent electric lamp, so that the combined light has desirable spectral characteristics especially suitable for colored motion picture projection.

A further object of my invention is the method of color correction or producing light having desired spectral characteristics, by combining the light from different sources so that light from one source supplements that from the other and both mutually contribute to the other's deficiencies, thereby generating a light which is a modification of both, without the deficiency of either.

Other objects and advantages of the invention, relating to the particular arrangement and construction of the various parts, will become apparent as the description proceeds.

In projecting motion pictures on a screen, an optical system comprising a light source, a condenser lens system, and a spherical mirror is customarily used for passing the light through the film, after which it is received by a suitable projection lens and focused on the screen. A parabolic or ellipsoidal reflector may be used in place of the condenser lens system and spherical mirror, but, with such, a somewhat lower efficiency results and it is therefore limited to projectors employing high-intensity carbon arcs.

The three most important characteristics of the light source in motion-picture projection are:
1. The size of said source.
2. The intensity of the system per unit of area, usually called the brilliance or brightness.
3. The spectral quality of the light emitted by the source.

The first, in conjunction with the condenser and projection lenses, determines the efficiency of the system. The second controls the maximum possible light output of a given system, and the third influences the appearance of the projected images on the screen. In general the smaller the light source for a given wattage, the higher the optical efficiency of the system. However, my invention is principally concerned only with the second and third characteristics; that is, average brightness or brilliance, and spectral quality, especially as it affects the projection of colored motion pictures.

Among the newer light sources available for motion picture projection is the high-intensity or high-pressure mercury vapor lamp. Such a lamp makes it possible to increase the source of brightness to from two to four times the maximum brightness obtainable when employing only tungsten filament lamps. The high-intensity mercury vapor lamp, however, has a discontinuous rather than a continuous spectrum, the predominant lines and bands being in the blue, yellow and green, with very little red. While such a source of light is satisfactory for black and white motion pictures, it is not satisfactory for colored motion pictures because of its deficiency in the red which results in an unnatural appearance of the colors when projected on the screen.

In accordance with my invention, I propose to increase the brightness, and at the same time correct the color of the high-intensity mercury source, by the addition of a secondary light source, focused by means of a suitable lens in the plane of the mercury source. This light source should be of such spectral quality as to overcome the red deficiency of the mercury vapor source, thereby rendering the ultimate source equivalent to white light. For this purpose either an incandescent tungsten filament lamp or gaseous discharge light source rich in red may be used. A spherical mirror in conjunction with the secondary light source increases the average brightness.

Referring to the drawing illustrating my invention:

Fig. 1 is a diagrammatic representation of a projection system embodying my invention.

Fig. 2 is a diagram showing the relative energy distribution of a combined system embodying my invention as compared with that in sunlight.

Fig. 3 is a diagram showing the combined luminosity distribution of my system, compared with that of sunlight.

Referring to the drawing in detail, like parts being designated by like reference characters, I show in Fig. 1 a system in which a primary source of light 1 is combined with a secondary source of light 2. Although in the present embodiment the primary source is indicated as being a high intensity mercury vapor lamp, and the secondary source as an incandescent tungsten filament lamp, yet I do not wish to be limited to this combination as I may use other sources of light, the main idea being to combine two intense sources of light which mutually supplement one another from a spectral standpoint. For example, instead of using the light from an incandescent tungsten filament lamp to supplement that from a high-intensity mercury vapor lamp, I may use a discharge lamp, in which the gaseous content includes neon or other gas or vapor, giving a light rich in red to supplement the deficiency of the mercury vapor lamp in this respect.

The light from the incandescent lamp or secondary light source 2 is combined with that from the primary source 1 in any desired manner as by means of a relay lens 3 and a concave reflector or spherical mirror 4. The combined light then passes to condenser lenses 5 and 6 and on to the motion picture film 7, or other object to be illuminated, through the aperture or film gate 8, and on to the projection system which includes lenses 9 and 10, which in turn focus the image of the film, if used, on a screen, not shown.

The combination of the two sources of light shown results in a brilliant light of desirable characteristics, which are graphically indicated by Figs. 2 and 3. Fig. 2 shows, as a full line, a curve 11 representing the relative energy distribution of light received from the sun. The showing is limited to that within the visible range or from approximately 400 to 700 millimicrons. It will be seen that the maximum of energy distribution is reached at about 580 millimicrons, which is in the yellow portion of the spectrum.

The dotted or lower curve 12, which intersects the sunlight curve at about 660 millimicrons, represents that from the incandescent filament lamp 2 and shows that with such a lamp the energy distribution is greatest toward the red end of the spectrum. The dotted lines 13 which rise from, and form approximate parallelograms above, the curved line 12, represent, in combination with the parts of said filament line 12 which are shown, the combined energy distribution curve for the duplex or mercury vapor and incandescent filament lamp source. In other words, the lines 13 represent the addition of the mercury arc bands to the continuous spectrum from the incandescent filament lamp, thereby giving a combined light source which, for practical purposes, approximates sunlight, as the deficiency of the mercury vapor arc in the red is supplemented by the richness of the incandescent filament source in that respect and the deficiency of the incandescent filament source in the violet and yellow portions of the spectrum, is supplemented by the violet and yellow light from the mercury vapor lamp.

Fig. 3 shows a comparison of the combined source of light with sunlight from a luminosity rather than an energy standpoint. The full line curve 14 represents the luminosity distribution for sunlight and shows that sunlight has its maximum luminosity at about 560 millimicrons which is also in the yellow part of the spectrum. The curve of luminosity, representing a combination of the luminosity curve 15 of the incandescent filament and the bands from the mercury arc, is represented at 16, when considered with the portions of the filament curve 15 which are drawn.

It will thus be seen that the combined source of light, for practical purposes, compares favorably with that from the sun, both lights having their maximum points from the standpoint of both energy distribution and luminosity distribution in the yellow portion of the spectrum, although the maximum for sunlight is a little farther toward the red end of the spectrum than that from the source of light combination of two sources of light in accordance with my invention.

If it is desired to make the combined source of light more nearly approximate sunlight than as indicated in Figs. 2 and 3, I propose to employ a light-purplish-tinted filter 17 through which the light passes before reaching the film 7. By using such a filter, the yellow peak of the combined light is toned down, with a consequent improvement in the relative proportion of the red and blue components of the spectrum, so that a light hardly distinguishable from daylight may thus be obtained, if such is desired, at a slight sacrifice in intensity of illumination. Other filters may be employed in accordance with the results desired.

From the foregoing it will be seen that I have devised a duplex light source by means of which light of very desirable spectral characteristics may be obtained, which light is particularly adapted for colored motion picture projection. It is, however, to be understood that my duplex light source may be used for any desired purpose including all types of projection sources required to give light of daylight or other desired quality, as for example, in connection with spotlighting, stage lighting, and color-photography. It will also be understood that although one embodiment of my invention has been disclosed, yet I wish to be limited only by the scope of the appended claims.

I claim:

1. In a projection system particularly adapted for use with colored motion pictures, in combination, a reflector, an incandescent electric lamp, a relay lens, a high-intensity mercury vapor lamp, condenser lenses, a film gate, and projection lenses, all in axial alignment and air spaced apart, whereby the image of the filament of said incandescent lamp is focused by the relay lens in the discharge path of the mercury lamp, and the said image and the radiation from the discharge of the mercury lamp are focused to a point beyond the film gate by means of a beam of light from each of said lamps.

2. In a projection system particularly adapted for use with colored motion pictures, in combination, a reflector, an incandescent electric lamp, a relay lens, a high-intensity mercury vapor lamp, condenser lenses, a light-purplish filter adjacent said condenser lenses, a film gate, and projection lenses, all in axial alignment and air spaced apart, whereby the image of the filament of said incandescent lamp is focused by the relay lens in the discharge path of the mercury lamp, and the said image and the radiations from the discharge of the mercury lamp are focused to a point beyond the film gate by means of a beam of light from each of said lamps.

3. In a projection system, in combination, a mercury vapor lamp, an incandescent electric lamp, a relay lens disposed between said lamps, and all air spaced and axially aligned, whereby the light from said incandescent lamp is focused in the discharge path of the mercury vapor lamp, condenser lenses also axially aligned with said lamps and disposed directly between said mercury vapor lamp and a film to be projected, and projection means on the other side of said film.

4. In a projection system, in combination, a mercury vapor lamp, an incandescent electric lamp, a relay lens disposed between said lamps, and all air spaced and axially aligned, whereby the light from said incandescent lamp is focused in the discharge path of the mercury vapor lamp, condenser lenses also axially aligned with said lamps and disposed directly between said mercury vapor lamp and a film to be projected, a light-purplish filter adjacent said condenser lenses, and projection means on the other side of said film.

5. Optical apparatus comprising an incandescent electric lamp, a high intensity mercury vapor lamp, a lens so arranged between said lamps that a real image of the filament of said incandescent lamp is formed substantially coincident with the discharge column of said mercury lamp, whereby light from this image combines with the light of said discharge column and diverges therefrom as light of correspondingly modified characteristics, condenser lens means upon which said combined light falls causing it to converge therebeyond, a film gate, and projection lenses, all in axial alignment and air spaced apart with respect to said lamps, lens and condenser lens means whereby the incandescent filament image and the mercury lamp radiation are focused to a point beyond the film gate.

6. Optical apparatus comprising a source of light, such as a vapor lamp, deficient in red radiations, a second source of light, such as an incandescent filament lamp or discharge lamp containing a gas such as neon or other gas or vapor, giving a light rich in red to supplement the deficiency of the first source, a lens positioned between said sources of light to form a real image of the second source substantially coincident with the first source, whereby light from this image combines with the light of said second source and the combined light diverges therefrom with correspondingly supplemented characteristics, condenser lens means upon which said combined light falls causing it to converge therebeyond, and projection lens means, all in axial alignment and air-spaced apart with respect to said light sources, whereby the radiations from said sources are directed as desired.

GJON MILI.